United States Patent [19]
McIntoch

[11] 3,709,460
[45] Jan. 9, 1973

[54] VALVE CONTROL SYSTEM
[75] Inventor: Harold A. McIntoch, South Pasadena, Calif.
[73] Assignee: Robertshaw Controls Company, Richmond, Va.
[22] Filed: March 12, 1971
[21] Appl. No.: 123,733

Related U.S. Application Data
[62] Division of Ser. No. 805,138, March 7, 1969, Pat. No. 3,577,066.

[52] U.S. Cl. ..................251/11, 236/68, 236/87, 60/23
[51] Int. Cl. ..........................F03g 7/06, F16k 31/02
[58] Field of Search ..........251/11; 236/68, 87; 60/23

[56] References Cited

UNITED STATES PATENTS 3,465,962   9/1969   Matulich et al..................251/11 X Primary Examiner—Arnold Rosenthal
Attorney—Fulwider, Patton, Rieber, Lee & Utecht

[57] ABSTRACT

A valve control system including a valve body defining a flow control port having flow therethrough controlled by a poppet coupled with a pressure responsive member which forms one wall of a control chamber. Fluid flow through a bleed passage leading from the control chamber is controlled by a pilot valve which is itself controlled by an electric drive means. Current to the electric drive means is controlled by electrical resistance means which is formed with transverse portions disposed in heat exchange relationship with one another and flexible for movement toward and away from one another to adjust the rate of heat exchange between such portions to thereby adjust the mutual heating hereof and vary the overall resistance of such resistance means to control current to the electric drive means.

11 Claims, 1 Drawing Figure

PATENTED JAN 9 1973
3,709,460
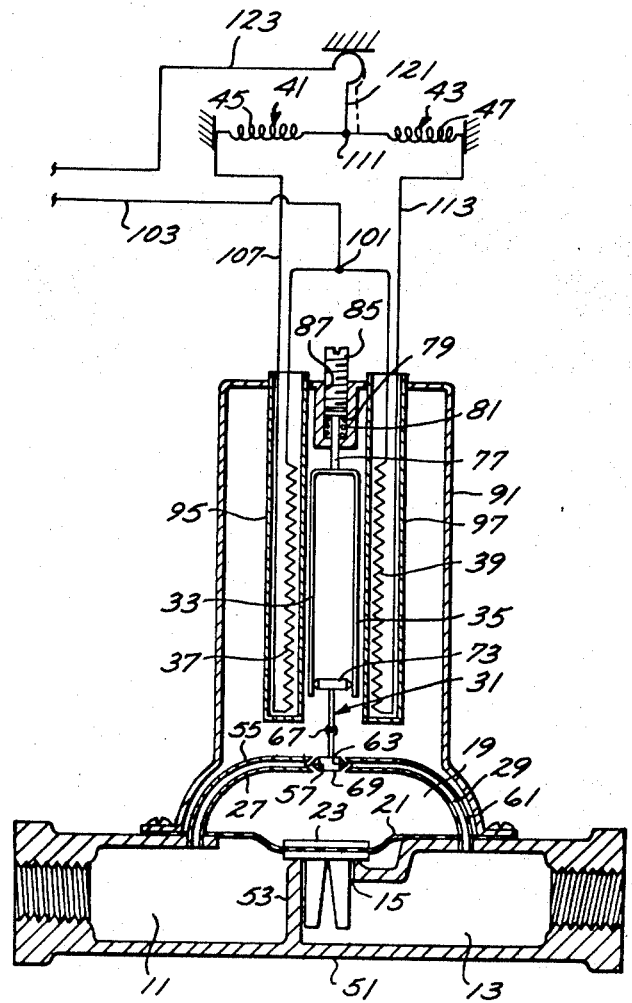
INVENTOR.
HAROLD A. McINTOSH
BY Fulwider, Patton, Rieber,
Lee and Utecht
ATTORNEYS 3,709,460

VALVE CONTROL SYSTEM

CROSS REFERENCE TO RELATED APPLICATION

This application is a divisional application of U.S. Ser. No. 805,138 filed Mar. 7, 1969, now U.S. Pat. No. 3,577,066.

BACKGROUND OF THE INVENTION

1. Field of the Invention

The present invention relates to electric control systems for controlling modulating valves.

2. Description of the Prior Art

Control systems for modulating valves have been proposed which include potentiometers in the form of a helical resistance lead having a wiper movable therealong. Such control systems suffer the shortcoming that the action of the wiper on the resistance lead may cause sparking thereby rendering such systems unacceptable for use in explosive environments. Further, the resistance leads frequently fail to exhibit uniform resistance throughout their length thereby making adjustment of the valve setting difficult.

SUMMARY OF THE INVENTION

The valve control system of present invention is characterized by a control chamber having one wall in the form of a pressure responsive member which is connected with the control poppet of the valve and wherein the bleed rate from the control chamber is controlled by a pilot valve driven by electric drive means connected in circuit with resistance means, such resistance means including transverse portions disposed in heat exchange relationship with one another and flexible for movement toward and away from one another to adjust the heat exchange relationship between the respective transverse portions to thereby adjust the temperature, and consequently, the overall resistance of the resistance means to thereby adjust current flow to the drive means.

An object of the present invention is to provide a valve control system of the type described that is responsive to a selected parameter to automatically adjust the valve setting.

Another object of the present invention is to provide a valve control system of the type described that does not incorporate any electrical contacts which are movable with respect to one another to thereby avoid the danger of arcing between such contacts.

These and other objects and the advantages of the present invention will become apparent from the consideration of the following detailed description when taken in conjunction with the accompanying drawing.

DESCRIPTION OF THE DRAWING

The single FIGURE in the drawing is a diagrammatic drawing of a valve control system embodying the present invention.

DESCRIPTION OF THE PREFERRED EMBODIMENT

The valve control system of present invention includes a valve body formed with an inlet 11 and outlet 13 a control port 15 being interposed therebetween. The valve body includes a control chamber 19 having one wall in the form of a pressure responsive diaphragm 21 which carries a poppet 23 for controlling flow through the port 15. THe control chamber 19 includes a pressurization passage 27 and bleed passage 29. Fluid flow in the pressurization passage 27 and the outlet passage 29 is controlled by a pilot valve, generally designated 31, which is, in turn, controlled by a pair of thermostatic blades 33 and 35 which have respective heat motors 37 and 39 disposed in heat exchange relationship therewith. Current through the respective heat motors 37 and 39 is controlled by a pair of electrical resistors 41 and 43 which include flexible, helical coils that form transversely extending loops 45 and 47 which are disposed in heat exchange relationship with one another such that flexing of the respective resistors 41 and 43 adjusts the spacing between such loops to thereby alter the temperature of the respective resistors 41 and 43 to thereby correspondingly alter the current flow rate therethrough and through the respective heat motors 37 and 39 to adjust the respective temperatures of the respective blades 33 and 35 to adjust the positioning of the pilot valve 31 to vary the fluid flow rate out the bleed passage 29 to adjust the pressure in the control chamber 19 to thereby flex the diaphragm 21 to adjust the poppet 23 with respect to the control port 15 to thereby alter the fluid flow rate therethrough.

The resistors 41 and 43 are made of material possessing the property of experiencing a relatively high change in resistance for a relatively small change in temperature. That is, the material is characterized by a high co-efficient of temperature resistance change. Pure nickel exhibits this characteristic, as do the material sold under the tradename "Balco" and "Hy-Tempco."

The resistors 41 and 43 shown in the preferred embodiment are in the form of helical coils wherein the convolutions of wire form transverse portions which have their spacing adjusted by flexing of such resistors. Other structures in which the portions thereof are formed for location in adjacent heat exchange relationship will adjust themselves to those skilled in the art. All such variations are within the scope of the present invention, it being important only that the flexing or deformation of the resistors 41 and 43 result in an alteration of the heat exchange relationship of adjacent portions to thereby effect the electrical characteristics of such adjacent portions.

The valve body is formed with a longitudinal run 51 having a centrally disposed transversely extending partition 53 which separates the inlet 11 from the outlet 13. A curved inlet tube 55 projects upwardly from the inlet 11 to form the pressurization passage 27 and terminates in a pressurization outlet 57 disposed in the control chamber 19. A curved outlet tube 61 forms the bleed passage 29 leading to the outlet 13 and terminates in an inlet control port 63 disposed in confronting relationship with the outlet control port 57.

The pilot valve 51 is in the form of a vertically extending rocket which is pivotally mounted on a pivot pin 67 and has its lower extremity formed with a horizontally projecting plug 69 which terminates on its opposite ends with conically shaped plugs for cooperation with the respective outlet and inlet control ports 57 and 63 to thereby control fluid flow to and from the control chamber 19. The upper extremity of the pilot valve rocker terminates in a horizontally disposed disc 73 which is held captive between the free ends of the opposed thermostatic blades 33 and 35. The thermostatic blades 33 and 35 are formed from a single thermostatic strip which is turned back on itself to form a U-shaped downwardly opening driving element.

The blades 33 and 35 are carried on their top end from a mounting pin 77 which terminates on its top end in a flat head 79 which is biased upwardly by a coil spring 81. Such coil spring 81 biases the head 79 upwardly against the lower end of an adjustment screw 85 which is screwed into a threaded bore 87 formed in the upper extremity of the valve bonnet 91 whereby vertical location of the thermostatic blades 33 and 35 may be controlled by screwing such adjustment screw 85 axially inwardly or outwardly.

A pair of upwardly opening thermally conductive tubes 95 and 97 project downwardly into the control chamber 19 for receipt of the respective heat motors 35 and 39. The upper ends of the heat motors 37 and 39 are connected together at a node 101 which is connected with a negative source lead 103. The lower end of the heat motor 37 is connected with one end of the resistor 41 by means of a lead 107 with the opposite end of such resistor being connected with the resistor 43 at a node 111. The opposite end of the resistor 43 is then connected with the lower end of the heat motor 39 by means of a lead 113.

The node 111 is connected with the free end of a temperature sensing electrically conductive thermostatic blade 121 with the stationary end of such blade being connected with a positive source lead 123.

In operation, the valve control system of present invention may conveniently be utilized for controlling the rate of fluid flow to a hydraulic heating or air conditioning system. Assuming the control system is to be utilized to control flow of hot fluid to a heating system, the inlet 11 is connected with the hot fluid source and the outlet 13 is connected with the heating unit. The thermostatic temperature sensing blade 121 is then mounted in the environment of which the temperature is to be controlled and when such temperature falls below a selected level, the blade 121 will be cooled and the lower end thereof will flex to the left a distance determined by the magnitude of the difference between the temperature sensed by the blade 101 and the selected environmental temperature. Such flexing of the lower end of the blade 121 will flex and collapse the resistor 43 while flexing and expanding the resistor 41. Collapse of the resistor 43 moves the coils 47 into closer spaced relationship thereby increasing the rate of heat transfer therebetween to thereby increase the overall temperature of the resistor 43. Such increase in temperature of the resistor 43 will increase the resistance thereof to thereby decrease the rate of current flow from the node 111 through such resistor 43 and the heat motor 39 to the node 101. Consequently, the heat motor 39 will be cooled to cause the thermostatic blade to be cooled to flex the lower end thereof to the right.

Concurrently, expansion of the resistor 41 moves the coils 45 into greater spaced relationship thereby reducing the rate of mutual heat transfer therebetween to thereby decrease the temperature of such resistor and decrease the resistance thereof. Consequently, the rate of current flow from the node 111 through the resistors 41 and the heat motor 37 will be increased thereby increasing the temperature of such heat motor 37 to thereby further heat the thermostatic blade 33 to cause the lower extremity to flex to the right. Such flexing to the right of the lower extremities of the blades 33 and 35 swings the upper end of the rocker of the pilot valve 31 to the right thereby rotating such rocker clockwise and moving the plug 69 closer to the outlet control port 57 of the inlet control passage 27 and moving such plug away from the inlet port 63 to the bleed passage 29 to thereby increase the rate of bleed through such passage. Consequently, the pressure in the control chamber 19 will be decreased thereby enabling the pressure on the inlet side of the partition 53 to press upwardly on the under side of the diaphragm 21 to raise the poppet 23 further off the control port 15 to increase the rate of fluid flow over the top end of the partition 53 and through such port 15 to the outlet 13.

The increase in the rate of hot fluid flow from the outlet 13 to the heater (not shown) will increase the temperature of the environment thereby heating the sensing blade 121 and causing the lower end thereof to flex to the left to its neutral position. When the sensing blade 121 resumes its neutral position, the flexible resistors 41 and 43 will exhibit equal resistances to current flow thereby balancing the bridge formed by such resistors and the heat motors 37 and 39 thereby providing equal current flow in such heat motors to cause the blades 33 and 35 to assume their neutral position thereby maintaining substantially equal flow through the control ports 57 and 63 to maintain the control chamber 19 at a substantially constant temperature to maintain the poppet 23 in constant spaced relationship with respect to the control port 15.

If the environment subsequently heats above the selected level, the sensing blade 121 will be cooled to cause the lower extremity to flex to the left thereby contracting the resistor 41 and expanding the resistor 43. Contraction of the resistor 41 will increase the self-heating thereof to thereby raise the resistance thereof and reduce the rate of current flow through the heat motor 37. Concurrently, expansion of the flexible resistor 43 decreases the rate of self-heating thereof thereby enabling such resistor to cool and lower the resistance thereof to increase the rate of current flow to the heat motor 39. Cooling of the motor 37 and heating of the motor 39 causes the lower extremities of the respective thermostatic drive blades 33 and 35 to flex and move to the left thereby rotating the rocker of the pilot valve 31 counterclockwise to move the plug 69 into closer spaced relationship with the bleed passage inlet port 63 and into greater spaced relationship with respect to the pressurization passage outlet port 57. Consequently, the pressure in the control chamber 19 will be increased to cause the diaphragm 21 to flex downwardly thereby moving the poppet 23 closer to the control port 15 to decrease the rate of fluid flow therethrough. The rate of delivery of hot fluid to the heating unit (not shown) is thus reduced thereby enabling the environment to thereby cool the thermostatic blade 121 and cause the lower end thereof to flex to the right to eventually assume its normal position.

From the foregoing it will be apparent that the valve control system of present invention provides a convenient and highly effective means for controlling a modulating valve in responsive variance in a selected parameter.

Various modifications and changes may be made with regard to the foregoing detailed description without departing from the spirit of the invention.

I claim:

1. A valve control system comprising:
   a valve body formed with an inlet, an outlet and a flow control port disposed intermediate said inlet and outlet, a poppet for controlling flow through said port, said valve body further being formed with a pressure chamber including a pressurization passage and a bleed passage and having one wall thereof in the form of a pressure responsive member coupled with said poppet;
   a pilot valve for controlling the flow rate out said bleed passage;
   electric drive means for controlling said pilot valve;
   electrical resistance means having transverse portions in heat exchange relationship and flexible for movement toward and away from one another to adjust said heat exchange relationship, the electrical resistance of said portions being temperature responsive so current flow therethrough is responsive to the temperature thereof;
   control means for moving said portions toward and away from one another to adjust the proximity and mutual heat transfer therebetween so the electrical current passing through said electrical resistance means is correspondingly adjusted; and
   electrical circuit means connecting said resistance means with said drive means whereby said control means may be adjusted to adjust the spacing between said transverse portions to adjust the rate of mutual heat exchange therebetween to adjust the resistance of said resistor means to adjust the current to said drive means thereby adjusting said pilot valve to alter the flow rate out said bleed passage to effect a pressure change in said chamber thereby moving said pressure responsive member to adjust the position of said poppet with respect to said port thereby adjusting the flow rate through said port.

2. A valve control system as set forth in claim 1 wherein:
   said drive means includes a thermostatic element coupled with said pilot valve and a heat motor disposed in heat exchange relationship with said element and connected in electrical circuit with said resistance means.

3. A valve control system as set forth in claim 1 wherein:
   said pressure responsive element is in the form of a diaphragm having said poppet mounted centrally therein.

4. A valve control system as set forth in claim 1 wherein:
   said resistance means is in the form of a pair of longitudinally disposed resistors connected together on their proximate ends;
   said control means is coupled with said proximate ends; and
   said drive means includes a pair of opposed drive elements responsive to the rate of current flow therethrough to urge said pilot valve in respective opposite directions; and
   said circuit means includes a divided circuit incorporating said resistors in respective first and second legs thereof and said drive elements in respective third and fourth legs thereof.

5. A valve control system as set forth in claim 1 wherein:
   said pressurization and bleed passages terminate in respective confronting outlet and inlet control ports;
   said pilot valve is interposed between said control ports; and
   said drive means drives in operative upon adjustment of said adjustment means to adjust said pilot valve in one direction to reduce the flow rate out said inlet control port and increases the flow rate out said outlet control port.

6. A valve control system as set forth in claim 1 wherein:
   said drive means includes a thermostatic element connected with said pilot valve;
   a heat motor disposed in heat exchange relationship therewith; and
   said control means includes a sensing element for sensing a selected parameter and responsive to variations thereof to flexing said resistor means to alter the current flow rate through said heat motor.

7. A valve control system as set forth in claim 1 wherein:
   said resistor means is in the form of an elongated electrical lead coiled to form a plurality of individual coils to define said transverse portions.

8. A valve control system as set forth in claim 4 wherein:
   said drive elements are in the form of a pair of first and second co-extensive thermostatic blades disposed in opposed relationship and respective heat motors defining said third and fourth legs and disposed in heat exchange relationship with said respective first and second blades.

9. A valve control system as set forth in claim 4 wherein:
   said control means includes a sensor for sensing a selected parameter and responsive to variations thereof to proportionately flex said resistor means.

10. A valve control system as set forth in claim 4 wherein:
    said control means is in the form of a thermostatic blade connected with said resistance means and responsive to temperature changes to flex said resistance means.

11. A valve control system as set forth in claim 5 wherein:
    said pilot includes a pilot valve poppet pivotally mounted from said valve body and having one extremity thereof interposed between said control parts.

* * * * *